United States Patent [19]

Tyson et al.

[11] Patent Number: 4,501,670

[45] Date of Patent: Feb. 26, 1985

[54] RECOVERY OF OIL AND SULFONATE FROM FILTER CAKE

[76] Inventors: William H. Tyson, 1874 School St., Moraga, Calif. 94556; Frank A. Stuart, 360 Riviera Dr., San Rafael, Calif. 94901

[21] Appl. No.: 505,905

[22] Filed: Jun. 20, 1983

Related U.S. Application Data

[63] Continuation-in-part of Ser. No. 335,261, Dec. 23, 1981, abandoned.

[51] Int. Cl.³ .............................................. B01D 12/00
[52] U.S. Cl. ..................................... 210/770; 210/772
[58] Field of Search ............... 210/769, 770, 771, 772, 210/776; 134/2, 25.1, 40; 208/8 LE; 585/853, 854

[56] References Cited

U.S. PATENT DOCUMENTS

| | | | |
|---|---|---|---|
| 2,828,862 | 4/1958 | Johnson | 210/772 |
| 3,362,533 | 1/1968 | Muller | 210/772 |
| 3,538,179 | 11/1970 | Nelson | 585/853 |
| 4,260,495 | 4/1981 | Bennoit et al. | 210/772 |
| 4,265,780 | 5/1981 | Kimura et al. | 134/40 X |
| 4,319,980 | 3/1982 | Jenkins | 208/8 LE |

OTHER PUBLICATIONS

Hackh's Chemical Dictionary, Julius Grant, Editor, 4th Edition, McGraw-Hill Book Co., N.Y. 1969, pp. 106 and 621.

Primary Examiner—David Sadowski
Attorney, Agent, or Firm—Limbach, Limbach & Sutton

[57] ABSTRACT

A process for treating filter cakes, obtained by filtering oils containing oil soluble alkaline earth metal sulfonates employing siliceous filter aids in the filtration, to release oil and sulfonate from the filter cakes is disclosed. The filter cakes are mixed with hot aqueous solutions of materials selected from the group consisting of alkali metal hydroxides, alkali metal salts of acids having ionization constants less than $1.5 \times 10^{-4}$ and mixtures of said salts and alkali metal hydroxides and held at a temperature above 160° F. to separate oil and sulfonate.

11 Claims, 2 Drawing Figures

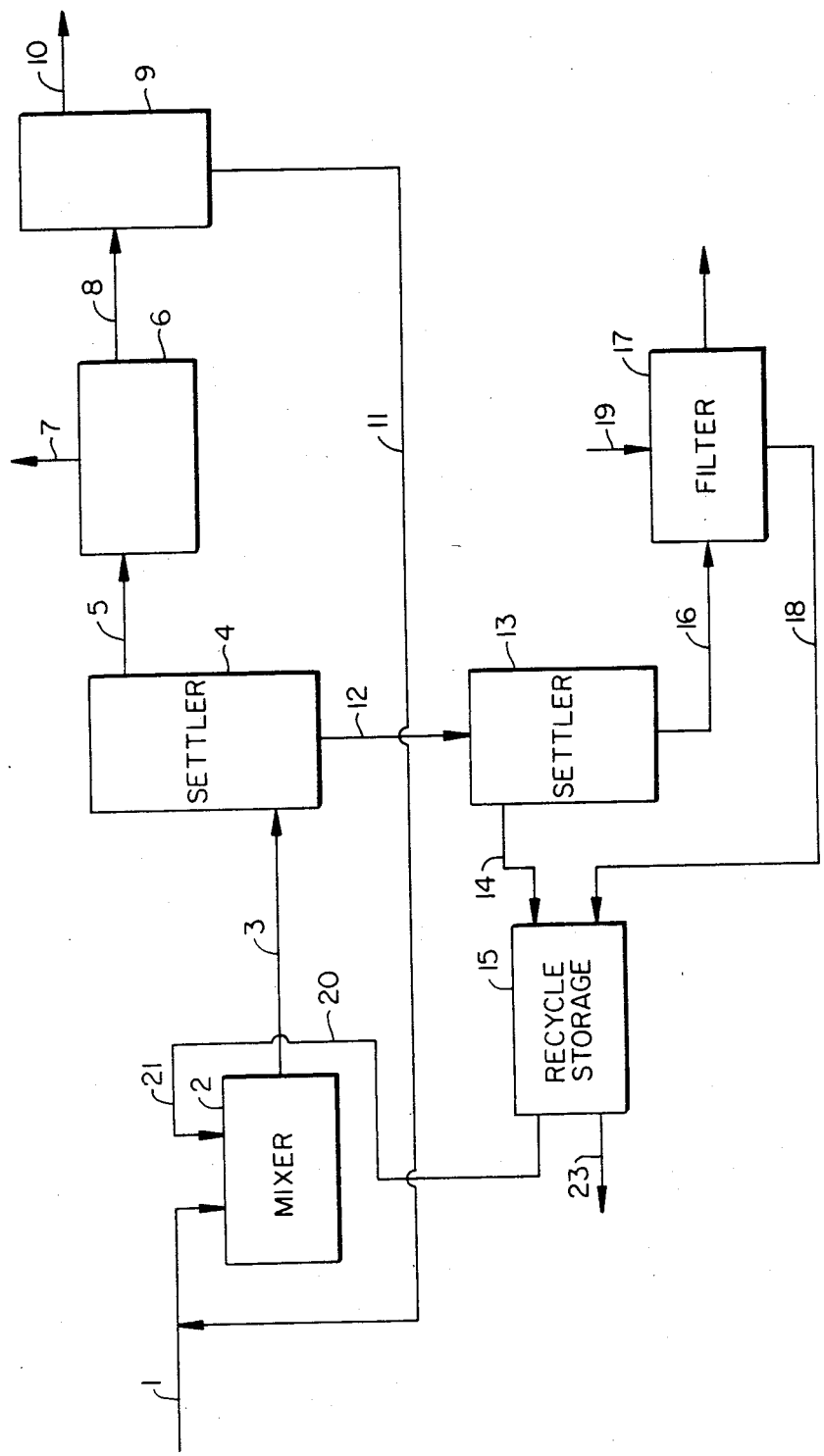
FIG._1.

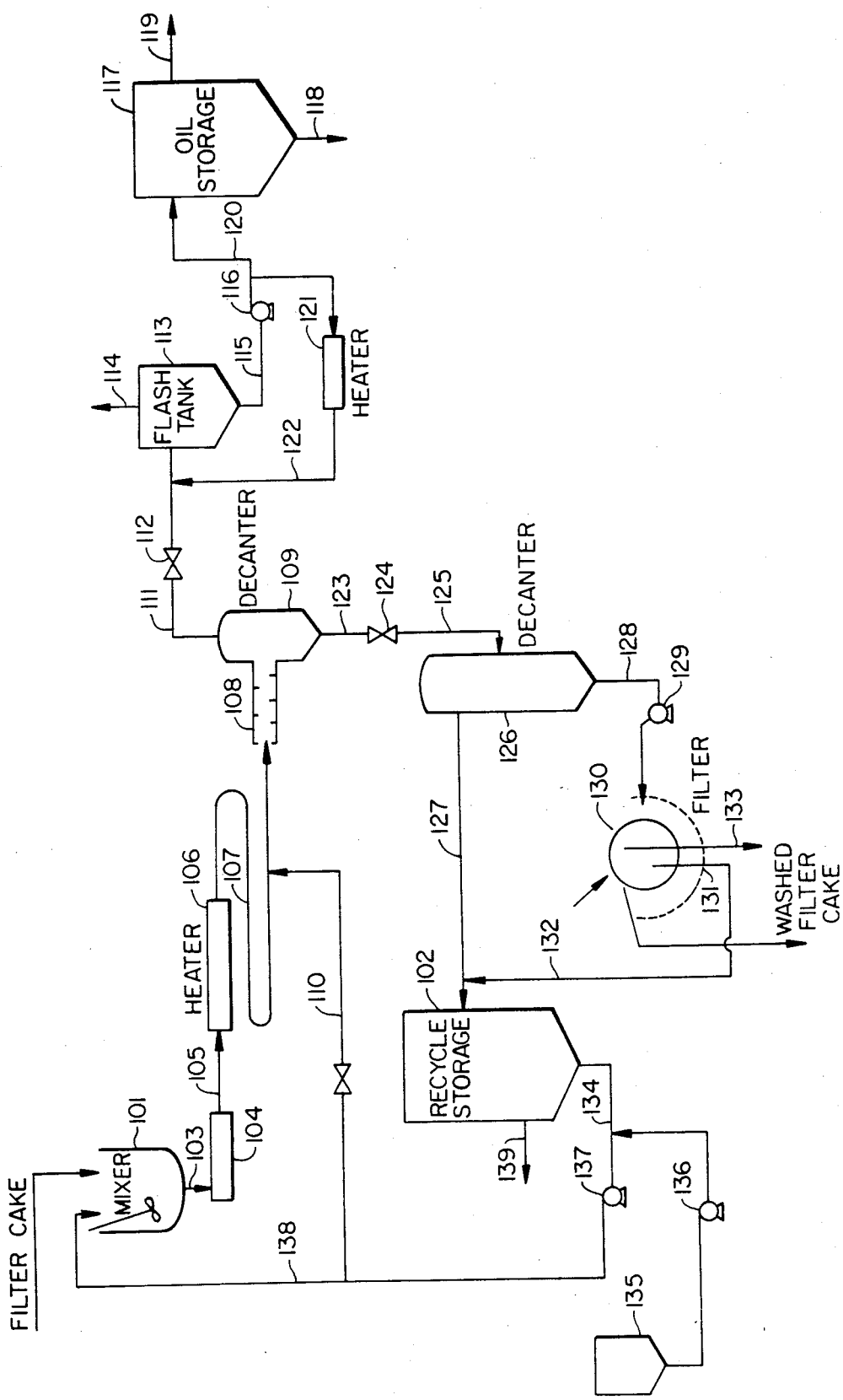
FIG._2.

RECOVERY OF OIL AND SULFONATE FROM FILTER CAKE

This is a continuation-in-part of application Ser. No. 335,261, filed Dec. 23, 1981, now abandoned.

DESCRIPTION

1. Technical Field

Oil soluble alkaline earth metal sulfonates are widely used as lubricating oil additives. These materials are produced by sulfonating a hydrocarbon feed stock having a high content of alkyl aromatic hydrocarbons characterized by a long alkyl side chain bonded to an aromatic radical. The hydrocarbon feed stocks may be either synthetic alkyl aromatic hydrocarbons produced by alkylating benzene with a high molecular weight propylene polymer or they may be refined heavy petroleum distillates characterized by a high content of the alkyl aromatic hydrocarbon molecular types. Suitable petroleum distillates typically have an average molecular weight of about 480. The synthetic feed stocks may be somewhat lower in molecular weight but average molecular weights are above 400. The sulfonic acids produced in the sulfonation reaction are then converted to alkaline earth metal sulfonates.

2. Background Art

Conversion of the sulfonic acids to alkaline earth metal sulfonates may be accomplished by direct neutralization with a base acting alkaline earth metal compound such as the hydroxide, oxide or carbonate. More commonly this conversion is made by neutralizing the sulfonic acids with an alkali metal hydroxide and the alkali metal sulfonate formed is converted to the alkaline earth metal sulfonate by metathesis with an alkaline earth metal compound such as the hydroxide, oxide or chloride. The product of either direct neutralization or metathesis is then treated to remove unreacted base material and sludge. This treatment usually involves a step of filtering the product to remove the undesired materials, the filtration step usually includes the addition of a siliceous filter aid to the neutralization reaction mixture and/or precoating the filter cloth with a filter aid. During the filtration step a filter cake is produced which contains the solids which were present in the neutralization or metathesis reaction mixture, and the filter aid. The filter cakes have a very substantial content of oil and sulfonate. Heretofore, for the most part these filter cakes have been discarded as an unwanted by-product of the sulfonate production process. Disposition of the cakes in this manner involves a loss of potentially valuable oil and sulfonate. In addition, some of the filter cakes are classified as hazardous waste materials and the cost of disposing of them safely is considerable.

The present invention provides a method for recovering oil and sulfonate from the spent filter cake and, in addition, reduces impurities contained in the filter cake to a level such that the treated filter cake is no longer hazardous, may be readily disposed of and may often serve useful purposes.

SUMMARY OF THE INVENTION

Pursuant to the invention filter cakes of the type above described are mixed with a weight excess of an aqueous solution of an alkali metal hydroxide, an alkali metal salt of an acid having an ionization constant less than $1.5 \times 10^{-4}$, or a mixture of such salts with an alkali metal hydroxide. The solutions are at concentrations such that their pH is at least 8. Alkali metal hydroxides and the alkali metal salts are used at concentrations in the range 5 to 20% by weight. Mixtures of the alkali metal salts and alkali metal are used as solutions containing 5–20% by weight of the salt and 3 to 10% by weight of alkali metal hydroxides.

Manufacturers of alkaline earth metal sulfonates commonly mix their filter cakes with hot water to facilitate handling. Such washed cakes have a considerable, up to 50% by weight, water content and the higher concentrations of the solutions are used when treating the water wet filter cakes.

The weight ratio of treating solution to filter cake may be in the range 0.5 to 1 to 5 to 1. Since more rapid oil separation from the filter cake is obtained at lower ratios it is preferred to add 1.5–3 parts by weight of solution to the cake initially, then heat the mixture to 160° F. to about 300° F. and hold this mixture at elevated temperature for 5 minutes to about one hour with agitation to initiate oil release from the cake. After such heating, hot solution is added to the mixture to bring the weight ratio of solution to filter cake to about 4–5 to 1. After solution addition the resultant mixture is allowed to settle, still at elevated temperature, for a period of about 5 minutes to about 1 hour during which period an oil layer forms at the top of the mixture. The oil layer is withdrawn and heated to evaporate contained water. The dry oil may then be allowed to stand for several hours or longer during which time any minor content of solids settles to the bottom of the storage container and is withdrawn.

Underlying the oil layer is a layer of solution containing the filter cake solids. This underlying layer is filtered and the filtrate is sent to a recycle storage tank and may be used in treating further quantities of filter cake. The filter cake obtained in this filtration is washed with hot water to reduce its pH. Ordinarily the washed cake has a pH below 12 and maybe dumped without hazard. In the event that a particular filter cake has a pH level above 12 it may be washed with a small amount of dilute acid, e.g., HCl to bring its pH below 12 so that no hazard attends conventional disposal.

BRIEF DESCRIPTION OF THE DRAWINGS

FIG. 1 of the appended drawings is a flow sheet showing the several steps in batch processing of the filter cake.

FIG. 2 of the appended drawings shows the several steps in continuous processing of the filter cake.

DETAILED DESCRIPTION OF THE INVENTION

The process of the invention is described in detail with reference to FIG. 1 of the drawings using sodium hydroxide as the treating solution.

Representative filter cake feeds to the process either contain about 35% by weight of solids which consist of unreacted alkaline earth metal compounds from the neutralization or metathesis steps, the sulfate of the base material used in neutralization and filter aid which is normally diatomaceous earth, 25% by weight oil and sulfonate and 40% by weight water or may be water free filter cakes containing solids and oil in the above proportions.

The filter cake is pressed through line 1 into mixer 2 which contains about three parts by weight of 5 to 20% sodium hydroxide solution per part of filter cake introduced. The temperature of the sodium hydroxide solution is from 160° F. to about 300° F. The mixer ordinarily is provided with agitating means to cause intimate mixing of the filter cake with the sodium hydroxide solution and intimate dispersal in it. The residence time of the filter cake in mixer 2 is at least 5 minutes and generally is in the range 15 minutes to about one hour. The filter cake-sodium hydroxide solution mixture is passed from mixer 2 through line 3 into settler 4. Settler 4 contains additional sodium hydroxide solution in amount about equal to the volume of the material in the mixer and usually an amount sufficient to bring the weight ratio of solution to filter cake to 4–5 to 1. The sodium hydroxide solution in the settler is at 160°–300° F. The mixture produced in the settler is allowed to stand at an elevated temperature for a period at least 15 minutes, but which may be longer, during which an upper oil layer and an aqueous lower layer containing solid components of the filter cake separate. The oil layer is withdrawn and passed through line 5 into vessel 6. The material in vessel 6 is kept sufficiently hot to cause evaporation of contained water which is removed as water vapor through line 7. After water evaporation has occurred the oil is passed through line 8 into tank 9 where it is allowed to stand for a period of several hours to several days. During the standing a minor bottom layer containing small amounts of solid materials from the filter cake separates from the oil. After standing in tank 9 to permit further settling, oil containing dissolved sulfonate is withdrawn from tank 9 through line 10 as product. The small amount of solid material settling in tank 9 can either be disposed of as a waste material or removed from tank 9 and passed via line 11 to mixer 2 with additional filter cake feed.

The bottom layer formed in settler 4 is passed through line 12 into settling tank 13 where the solid materials of the filter cake settle to form a lower rather dense phase slurry of these solids in sodium hydroxide solution and an upper layer of clear sodium hydroxide solution. The upper clear layer may be withdrawn from settler 13 via line 14 and passed into recycle storage tank 15 or may be sent to filter 17 via line 16. The lower dense slurry phase formed in settler 13 is withdrawn and passed thru line 16 to filter 17, the filtrate is withdrawn and passed through line 18 into recycle storage tank 15. The filter cake is then washed with hot water introduced through line 19 and the washings may also be passed through line 18 into recycle storage tank 15. The contents of recycle storage tank 15 consist principally of a solution of sodium hydroxide and sodium silicate, the latter being formed by action of sodium hydroxide on siliceous material of the filter aid.

As operation is continued material from recycle storage tank 15 is passed through lines 20 and 21 into mixer 2, providing the major portion of the liquid contacting fresh filter cake. Additional sodium hydroxide in concentrated form is passed through line 21 into the mixer 2, the quantity of sodium hydroxide being an amount sufficient to bring the hydroxyl ion content of the solution entering into mixer 2 to a high level corresponding to that of the content of the mixer at startup.

As the recycle operation is continued the sodium silicate content of the material in recycle storage tank 15 rises. In order to facilitate maintenance of sufficiently high alkalinity in the liquid entering mixer 2, a portion of the content of recycle storage tank may be bled from the tank via line 23 and disposed of.

Continuous operation as shown in FIG. 2 of the drawings is described employing sodium hydroxide as the treating solution.

At startup filter cake and 10% sodium hydroxide are introduced into mixer 101 in proportions such that the ratio of sodium hydroxide solution to filter cake is 3:1. Introduction of these materials into mixer 101 is continued until a substantial volume of recycle liquid is accumulated in recycle tank 102. After the accumulation of sufficient recycle liquid the recycle liquid is introduced into mixer 101 with sufficient concentrated sodium hydroxide solution being added to maintain alkalinity at about that of 10% by weight sodium hdyroxide. The process is described after a steady state condition is reached and recycle liquid is used to mix with the filter cake in 101.

The mixture of filter cake and sodium hydroxide solution in mixer 101 is agitated to disperse the filter cake in the sodium hydroxide solution. Slurry is withdrawn from mixer 101 via line 103 and pumped by pump 104 through line 105 into heater 106. The mixture entering heater 106 is heated either by indirect heat exchange or by introduction of steam to a temperature in the range 250° to 300° F. The flow rate of the slurry through the heater and line 107 is adjusted to provide a residence time in heater 106 and line 107 of from 5 to 20 minutes. The hot mixture is withdrawn through line 107 and passes through enlarged baffle line 108 into decanter 109. Line 107 is of sufficient length that the passage of the hot mixture from heater 106 through it to baffled line 108 consumes from 5 to about 15 minutes, permitting separation of the oil from the filter cake solids. Hot recycle liquid is passed through line 110 into line 107 in amount to bring the ratio of total recycle liquid plus liquid from mixer 101 to filter cake to a ratio about 5:1 by weight. In decanter 109 an upper oil phase separates and overlays a lower slurry phase consisting of filter cake solids and sodium hydroxide solution. The upper oil phase is withdrawn through line 111 and passes through pressure reduction valve 112 into flash tank 113. Water contained in the oil is withdrawn from flash tank 113 via line 114. Dried oil is withdrawn from flash tank 113 via 115 and pumped by pump 116 into oil storage tank 117. A small amount of solids separate and drop to the bottom of oil storage tank 117 and is withdrawn from that tank through line 118, the withdrawn material may be recyeled to mixer 101 via a line not shown. Oil-sulfonate product is withdrawn from oil storage tank 117 via line 119. A side stream of dry oil is withdrawn from line 120 and passes through heater 121 where the withdrawn oil is heated sufficiently to maintain the temperature in the flash tank at 230° to 240° F. The heated oil is passed from heater 121 through line 122 into line 112. A slurry of filter cake solids and sodium hydroxide solution is withdrawn from decanter 109 via line 123 and passes through pressure reduction valve 124 and line 125 into a second decanter 126. In decanter 126 a clear sodium hydroxide upper layer forms and a heavy slurry forms a bottom layer in the decanter. The clear upper layer is withdrawn from decanter 126 via line 127 and passes into recycle storage tank 102. Slurry is withdrawn form the bottom of the decanter 126 via line 128 and pumped by slurry pump 129 to filter 130. Filtrate is withdrawn from the filter and passes via lines 131 and 132 into recycle tank 102. The filter cake washed with water and the washings are withdrawn via line 133. Recycle liquid is withdrawn from recycle storage tank 102 via line 134. Concentrated sodium hydroxide solution is stored in tank 135 from which it is withdrawn and pumped by pump 136 into line 134. The concentrated sodium hydroxide-recycle liquid mixture is pumped by pump 137 through line 138 into mixer 101. Recycle liquid may be withdrawn from recycle tank 102 via line 139 as required to prevent excess liquid build-up in the system.

The following examples further describe the process of the invention.

EXAMPLE 1

Five pounds of a filter cake obtained by filtering a calcium petroleum sulfonate were added to ten pounds of boiling 7.5% sodium hydroxide solution in water. The mixture was maintained at boiling temperature for 20 minutes. After approximately 5 minutes oil began to separate from the filter cake and form an oil layer at the upper surface. During the heating period the filter cake-sodium hydroxide mixture began to thicken, presumably due to expansion of clay contained in the filter aid of the filter cake. Additional 7.5% sodium hydroxide was added during the heating period to maintain fluidity of the mixture. During the heating period the quantity of sodium hydroxide added was approximately five pounds. At the end of the 20-minute heating period the reaction mixture was pourd into a 7 gallon container containing 40 pounds of boiling 7.5% sodium hydroxide solution. The container was designed with an overflow weir at its upper rim so that oil which floated to the surface could be drawn off at the top of the body of liquid. The container was of considerably greater height than diameter and had a conical bottom so that the filter cake solids accumulated toward the base of the container. The mixture was allowed to settle for 30 minutes. During this time oil-sulfonate floated to the top of the body of liquid and the solids from the filter cake concentrated toward the bottom of the container. A layer of fairly clear sodium hydroxide solution developed between the oil and the slurry. After the clear sodium hydroxide layer had reached a depth of about two inches the oil-sulfonate upper layer was decanted from the surface of the clear layer. The decanted mixture of oil and some water solution was permitted to settle further in a second settler provided with a bottom drain and the lower water layer was removed. The clear sodium hydroxide layer was reserved for use in treating further quantities of filter cake. The slurry of filter cake solids and sodium hydroxide was drained from the lower part of the container and passed to a vacuum type filter where the surplus sodium hydroxide was removed from the solids. The solids were washed with clear water using an amount about equal to the weight of sodium hydroxide solution remaining in the filter cake. The oil-sulfonate layer was heated to drive off contained water and the oil-sulfonate mixture after this treatment was ready for treatment with an alkaline earth metal compound such as calcium carbonate or calcium hydroxide to convert the sodium sulfonates to calcium sulfonates.

EXAMPLE 2

A filter cake obtained by filtering a calcium sulfonate-oil mixture was dried to remove water. One hundred fifty two grams of this cake, which by soxhlet extraction had the oil-sulfonate content about 57% by weight, was mixed with 417 grams of 10% sodium carbonate solution to which 5 cc of 30% sodium hydroxide had been added. The resulting mixture was maintained at boiling temperature for 60 minutes. After the heating period 571 grams of the mixture was withdrawn and passed into a settling zone containing 500 grams of 10% sodium carbonate solution. The resulting mixture was maintained at approximately boiling temperature for a period of about 30 minutes during which an upper oil-sulfonate layer formed and a lower sodium carbonate-filter cake solids slurry settled out. Ninety one grams of wet oil were removed from the settler and passed into a drying zone where 155 grams of toluene were added to the oil and the resultant mixture was heated and then distilled to remove toluene and water in amount of 158 grams. Eighty eight grams of oil-sulfonate were recovered at the end of the distillation. Nine hundred eighty grams of filter cake solids and sodium carbonate solution were withdrawn from the first settling zone and passed into a second settling zone where a clear sodium carbonate layer formed over a lower layer of filter cake solids in sodium carbonate. Four hundred eleven grams of clear sodium carbonate solution were withdrawn. Five hundred sixty nine grams of a slurry of filter cake solids in sodium carbonate were removed from the second settler and passed to a vacuum filter where the mixture was filtered and then the filter cake washed with 260 grams of water. The washed filter cake was dried and 83 grams of dry filter cake were recovered. The addition of toluene facilitated the removal of water from the oil-sulfonate layer. Toluene forms a low boiling azeotrope with water so that water removal is speeded up. Toluene need not, however, be employed and simple heating of the oil-sulfonate mixture for somewhat longer periods of time effectively removes the water. The recovered oil-sulfonate mixture was suitable for conversion to calcium sulfonate by metathesis with a calcium salt such as calcium chloride.

EXAMPLE 3

Two hundred twenty nine pounds of a filter cake obtained by filtering oil containing calcium mahogany sulfonate using a diatomaceous earth filter aid and 558 pounds of a 20% solution of boiling sodium carbonate were introduced into a mixer. The filter cake had been mixed with water to facilitate handling before being treated by the process of the invention. Live steam was blown into the mixture to maintain the temperature at approximately boiling point. The mixture was continuously agitated. After about ten minutes an oil phase began to appear at the surface of the boiling mixture. Heating with agitation was continued for a total period of 45 minutes. At the end of that time the hot mixture was passed into a settling tank containing 200 pounds of 10% sodium carbonate which was at about 190° F. An additional 670 pounds of 10% sodium carbonate were pumped into the bottom of the settling tank. The contents of the settling tank were maintained in a quiescent condition for a period of one hour at a temperature of about 188° F. An oil layer separated and appeared at the top of the liquid in the settling tank. The settling tank was approximately full at this time and was equipped with an overflow weir. Additional 10% sodium carbonate was pumped into the settling tank to cause an overflow of the oil layer. One hundred five pounds of oil having a water content about 15% by weight overflowed from the settling tank and were collected. The settling tank was permitted to remain hot and quiescent overnight. The next day additional oil had floated to the top of the settling tank and was collected. The additional oil had a weight of 35.5 pounds.

The collected oil containing water had a total weight of 140 pounds and this oil was heated to evaporate contained water. When essentially all of the water had been evaporated from the oil a total of 104 pounds of clear oil-sulfonate material were recovered as product.

EXAMPLE 4

Two hundred twenty five pounds of a filter cake obtained by filtering a calcium mahogany sulfonate using a diatomaceous earth filter aid and 422 pounds of an aqueous solution containing 12% by weight sodium carbonate and 8% by weight sodium hydroxide were introduced into a mixing vessel. The filter cake contained about 39 pounds water, 77 pounds of oil-sulfonate and 108 pounds of filter aid. The mixture was heated to a temperature of 210° F. and agitated for a period of 45 minutes. Agitation was ceased and a layer of clear oil appeared on the surface of the mixture. Thirty six pounds of oil were removed from the surface of the liquid in the mixture. The remainder of the mixture was passed into a settling tank and 200 pounds of a solution containing 6% sodium carbonate and 4% sodium hydroxide by weight were added to the settling tank and the resultant mixture was agitated. The mixture was then allowed to become quiescent and an additional 1650 pounds of the sodium carbonate-sodium hydroxide mixture were pumped into the bottom of the settling tank. The resulting mixture was maintained at a temperature of 210° F. and allowed to stand for one hour. At the end of that time an oil layer had formed on the surface of the mixture in the settling tank and an additional 55.5 pounds of oil-sulfonate were decanted from the surface of the mixture. The oil was heated to drive off contained water as water vapor and the dried oil had a weight of 69 pounds.

The slurry contained in the bottom of the settling tank was removed and filtered. The filtrate was reserved for use in treating further quantities of filter cake. The filter cake after water wash had a pH of 12.3 and was a clear, white material.

EXAMPLE 5

50 grams of a filter cake obtained in commercial filtration of oil containing dissolved calcium sulfonate additive were heated to 180° F. and 50 cubic centimeters of 10% sodium silicate were added in small increments with vigorous agitation between the additions. The resultant mixture was allowed to percolate for 5 minutes on a hot plate and then placed in an oven for 15 minutes at 200° F.

A separation occurred in which a clear, bright oil-sulfonate phase separated on the surface of a pasty slurry of filter aid in sodium silicate solution.

EXAMPLE 6

60 grams of a filter cake obtained during commercial filtration of oil containing calcium sulfonate were heated 180° F. 120 cubic centimeters of hot saturated sodium carbonate solution were slowly added to the filter cake while vigorously agitating the mixture. After about 20 minutes an oil phase began separating on the surface of a lower phase which was a slurry of filter aid in sodium carbonate. After an appreciable oil-sulfonate layer had formed on top of the slurry, and additional 200 cubic centimeters of the saturated sodium bi-carbonate solution were added and a foamy mixture of oil and sodium bicarbonate formed on the surface of a lower slurry layer. The entire mixture was placed in an oven and held at about 180° F. for 20 minutes during which a separation into three distinct phases occurred. The bottom phase had a volume of about 90 cc's and was a light-colored filter aid slurry, a middle layer of about 230 cc's in volume consisting almost entirely of sodium bicarbonate formed, and an upper phase having a 40 cc volume of a light-colored oil formed on the surface of the sodium bicarbonate phase.

EXAMPLE 7

Example 6 was repeated but substituting 20% borax solution for the sodium bicarbonate solution. A three phase separation similar to that described in Example 6 occurred and the oil-sulfonate upper phase was decanted.

Mixtures of solutions of sodium phosphate, sodium silicate and sodium borate with an alkali metal hydroxide may be used in the same manner and with the same effect as sodium carbonate and sodium carbonate-sodium hydroxide mixtures in the examples above. A number of other alkali metal salts of acids having ionization constants less than $1.5 \times 10^{-4}$ are operative but the acid components are more expensive, preference for the above-named salts is based on economic considerations.

When highly alkaline solutions are employed in the treatment of the filter cake there is a considerable proportion of the calcium sulfonate which is converted to sodium sulfonate by metathesis so that a considerable proportion or even all of the recovered sulfonate may be sodium sulfonate.

Diatomaceous earth is the most commonly used filter aid but other filter aids can be used which may contain both diatomaceous earth and some amount of clay when the diatomaceous earth is taken from natural deposits.

Alkaline earth metal sulfonates other than calcium sulfonate, notably barium sulfonate are produced by similar processes and in their production similar filter cakes are obtained and these filter cakes may be treated to recover contained oil and the sulfonate which is present in the oil.

The process of the invention may be integrated with a manufacturing process in which alkaline earth metal sulfonates are produced. In the manufacture of these sulfonates a high molecular weight alkyl aromatic compound is sulfonated usng concentrated sulfuric acid or oleum. The sulfonation reaction product is then ordinarily neutralized with sodium hydroxide and the resulting sodium sulfonate is subjected to a metathesis reaction in which the sodium sulfonate and an alkaline earth metal compound, such as hydroxide or chloride react to form the alkaline earth metal sulfonate. The oil-sulfonate product recovered by the process of the invention may be directly introduced into the metathesis reaction of the sulfonate manufacturing plant where contained sodium sulfonate is converted to calcium sulfonate and becomes a part of a plant product.

When, in the practice of the invention, the filter cake-solution mixtures are maintained at temperatures above the boiling point of the solution employed the mixtures are held under elevated pressures sufficient to maintain the solution in liquid phase.

Oil soluble succinimides are widely used as lubricating oil additives and the process by which they are produced requires a filtration step employing a filter aid. Filter cakes obtained by filtering an oil-succinimide mixture have been treated by the process of the invention and it is found that a clear oil-succinimide product can be obtained.

We claim:

1. A process for treating a filter cake produced by filtering oil containing an oil soluble alkaline earth metal sulfonate employing a siliceous filter aid, to release oil and sulfonate from the filter cake which comprises,
   (a) mixing the filter cake with at least 50% of its weight of a hot aqueous solution of a material selected from the group consisting of alkali metal hydroxides, alkali metal salts of acids having an ionization constant less than $1.5 \times 10^{-4}$ and mixtures of said salts and alkali metal hydroxides, said solutions having a concentration such that their pH is at least 8, and
   (b) maintaining the resulting mixture at a temperature above 160° F. for a period of at least 5 minutes.

2. A process for treating a filter cake produced by filtering oil containing an oil soluble alkaline earth metal sulfonate employing a siliceous filter aid, to recover oil and sulfonate from the filter cake which comprises,
   (a) mixing the filter cake with a weight excess of a hot aqueous solution of a material selected from the group consisting of alkali metal hydroxides, alkali metal salts of acids having an ionization constant less than $1.5 \times 10^{-4}$ and mixtures of said salts and alkali metal hydroxides, said solutions having a concentration such that their pH is at least 8,
   (b) maintaining the resulting mixture at a temperature above 160° F. for a period of at least 5 minutes,
   (c) adding to the hot mixture of step (b) a further quantity of the hot solution employed in step (a) sufficient to cause separation of an upper oil layer, and
   (d) removing the upper layer.

3. The process defined in claim 2 wherein the aqueous solution is 5–20% by weight sodium hydroxide.

4. The process defined in claim 2 wherein the aqueous solution is 5–20% by weight sodium carbonate.

5. The process defined in claim 2 wherein the aqueous solution contains 5–20% by weight sodium carbonate and 3–10% by weight sodium hydroxide.

6. The process defined in claim 2 wherein the aqueous solution employed has a pH in the range 11 to 14.

7. The process defined in claim 2 wherein the further quantity of hot solution added in step (c) brings the weight ratio of solution to filter cake to 4–5 to 1.

8. The process defined in claim 2 wherein the aqueous solution employed is sodium silicate solution.

9. The process as defined in claim 2 wherein the aqueous solution is borax solution.

10. The process as defined in claim 2 wherein the aqueous solution employed is concentrated sodium bicarbonate solution.

11. A process for treating a filter cake obtained by filtering oil containing an oil soluble alkaline earth metal sulfonate employing a siliceous filter aid, to recover oil and sulfonate from the filter cake which comprises,
    (a) mixing the filter cake with about 1.5 to about 3 times its weight of a hot aqueous solution having a pH in the range 11 to 14 and containing as the solute a material selected from the group consisting of sodium hydroxide, sodium carbonate, sodium borate, sodium phosphate and mixtures thereof in a mixing zone,
    (b) maintaining the resultant mixture at temperatures in the range 160°–300° F. for at least 5 minutes,
    (c) passing the mixture from the mixing zone into a settling zone and adding to the mixture additional aqueous solution in amount sufficient to bring the weight ratio of the aqueous solution to filter cake to at least 4 to 1,
    (d) maintaining the mixture obtained in step (c) quiescent at a temperature above 160° F. until it separates forming an upper oil layer and a lower layer containing aqueous solution and filter cake solids,
    (e) withdrawing the oil layer,
    (f) withdrawing the lower layer, filtering it, and returning at least a portion of the filtrate to the mixing zone, and
    (g) washing the filter cake from step (f) with water or with dilute acid to obtain a washed filter cake having a pH below 12.

* * * * *